United States Patent
Hinson et al.

(10) Patent No.: US 12,428,138 B2
(45) Date of Patent: Sep. 30, 2025

(54) BLENDED FALX WINGLET

(71) Applicant: Textron Aviation Inc., Wichita, KS (US)

(72) Inventors: Bryan C. Hinson, Wichita, KS (US);
Corey Hagemeister, Wichita, KS (US);
Kelly Laflin, Wichita, KS (US);
Gonzalo Mendoza, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 18/463,625

(22) Filed: Sep. 8, 2023

(65) Prior Publication Data

US 2025/0083805 A1   Mar. 13, 2025

(51) Int. Cl.
*B64C 23/06* (2006.01)

(52) U.S. Cl.
CPC ................. *B64C 23/069* (2017.05)

(58) Field of Classification Search
CPC .................................................. B64C 23/069
See application file for complete search history.

(56) References Cited

U.S. PATENT DOCUMENTS

| | | | |
|---|---|---|---|
| 5,348,253 A | 9/1994 | Gratzer | |
| 6,578,798 B1 * | 6/2003 | Dizdarevic | B64C 23/069 |
| | | | 244/35 R |
| 8,366,056 B2 | 2/2013 | Garang | |
| 9,764,825 B2 | 9/2017 | Guida | |
| 9,988,142 B2 * | 6/2018 | Heller | B64C 23/069 |
| 10,106,247 B2 | 10/2018 | Gratzer | |
| 10,625,847 B2 * | 4/2020 | Dhandhania | B64C 23/069 |
| D930,549 S | 9/2021 | Bochud | |
| 11,279,469 B2 * | 3/2022 | Petscher | B64C 23/065 |
| 11,312,481 B2 * | 4/2022 | Petscher | B64C 23/069 |
| 11,427,307 B2 * | 8/2022 | Petscher | B64C 23/069 |
| D978,057 S | 2/2023 | Bochud | |
| D1,013,609 S | 2/2024 | Bochud | |
| D1,026,788 S | 5/2024 | Mendoza | |
| D1,026,789 S * | 5/2024 | Mendoza | D12/345 |
| D1,041,387 S | 9/2024 | Fizer | |
| 2009/0084904 A1 * | 4/2009 | Detert | B64C 23/065 |
| | | | 244/199.4 |
| 2012/0185181 A1 * | 7/2012 | Chankaya | B64C 23/076 |
| | | | 702/41 |
| 2017/0247105 A1 | 8/2017 | Heller | |

(Continued)

OTHER PUBLICATIONS

German Utility Model DE202014104042 and translation (Year: 2020).*

(Continued)

*Primary Examiner* — Joshua J Michener
*Assistant Examiner* — Michael B. Kreiner
(74) *Attorney, Agent, or Firm* — Nixon & Vanderhye, P.C.

(57) ABSTRACT

Blended falx winglets are provided which include an initial winglet section adapted to being attached to an aircraft wingtip, and forward and aft sub-winglets extending outwardly and upwardly from the initial winglet section. The forward and aft sub-winglets may have respective curved transition sections with different radii of curvature, e.g., the radius of curvature of the curved transition section of the forward sub-winglet may be greater than the radius of curvature of the curved transition section of the aft sub-winglet.

8 Claims, 5 Drawing Sheets

(56) References Cited

U.S. PATENT DOCUMENTS

2018/0304997 A1    10/2018  Dhandhania
2021/0197961 A1*   7/2021   Bochud ................. B64C 23/069
2023/0406484 A1    12/2023  Mendoza
2024/0326990 A1    10/2024  Buskirk
2024/0375770 A1    11/2024  Laflin

OTHER PUBLICATIONS

Alternative translation of DE202014104042U1 (Year: 2020).*
"Blended winglets rack up 7 billion gallons of jet fuel savings", bizjournals.com, published Apr. 10, 2017, available online at URL:https://www.bizjournals.com/seattle/news/2017/04/10/blended-winglets-rack-up-7-billing-gallons-of-jet-html.
FACC Wichita performs 1000th split scimitar winglet modification, compositesworld.com, published Oct. 1, 2019, available online at URL:https://www.compositesworld.com/news/facc-wichita-performs-1000th-split-scimitar-winglet-modification.

* cited by examiner

BLENDED FALX WINGLET

CROSS-REFERENCE TO RELATED APPLICATION

This application is related to commonly owned U.S. Design patent application Ser. No. 29/911,829 filed on Sep. 8, 2023 (now U.S. Design Pat. No. D1,073,579), the entire content of which is expressly incorporated hereinto by reference.

FIELD

The embodiments disclosed herein relate generally to aerodynamic structures, especially blended aircraft winglets.

BACKGROUND

Wingtip vortices form when lift is generated by an aircraft wing. Such vortices disadvantageously contribute to wasted energy imparted into the airstream of the aircraft. Winglets are well known aerodynamic structures positioned at the wingtips which serve to reduce the size and strength of the vortices thereby in turn reducing lift-induced drag. Various winglet designs are known, for example, as described in U.S. Pat. Nos. 5,348,253, 8,366,056 and 10,106,247 (the entire contents of each being expressly incorporated hereinto by reference).

Notwithstanding the prior proposals for winglet designs, there exists a continual need to improve the aerodynamic properties of winglets so as to improve aircraft performance. It is towards fulfilling such a need that the embodiments disclosed herein are directed.

SUMMARY

Broadly the embodiments of the invention are directed toward blended falx winglets which include an initial winglet section adapted to being attached to an aircraft wingtip, and forward and aft sub-winglets extending outwardly and upwardly from the initial winglet section. In certain embodiments, the forward and aft sub-winglets will have respective curved transition sections with different radii of curvature. According to some embodiments, the radius of curvature of the curved transition section of the forward sub-winglet may be greater (e.g., at least about 1.5 times greater) than the radius of curvature of the curved transition section of the aft sub-winglet.

Each of the forward and aft sub-winglets may have a terminal end section extending from the curved transition section that may be planar or curved. The terminal end section of the aft sub-winglet may be positioned inboard relative to the terminal end section of the forward sub-winglet.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
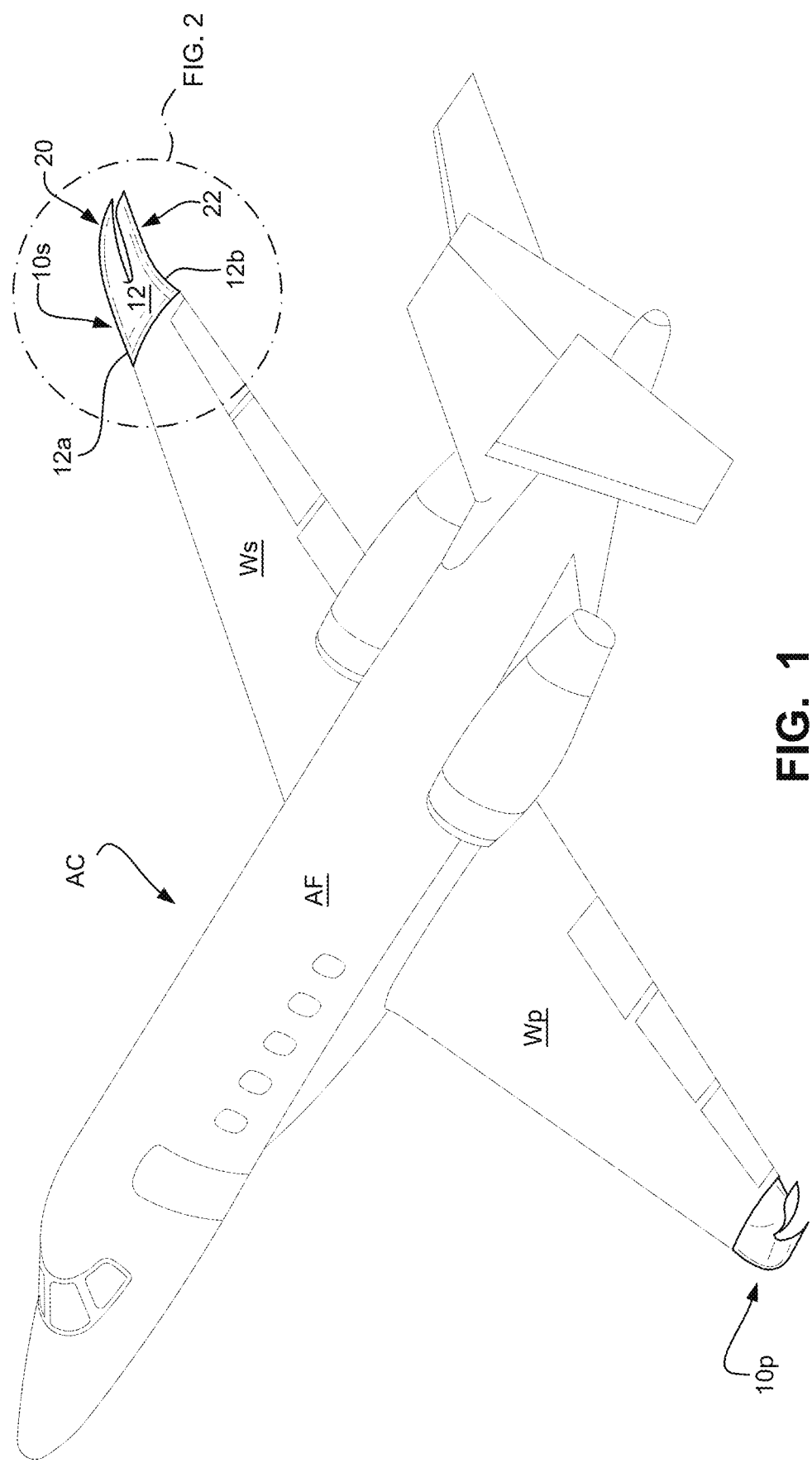
FIG. 1 is forward looking top perspective view of an aircraft which includes blended falx winglets in accordance with an embodiment of the present invention.
Figure 2:
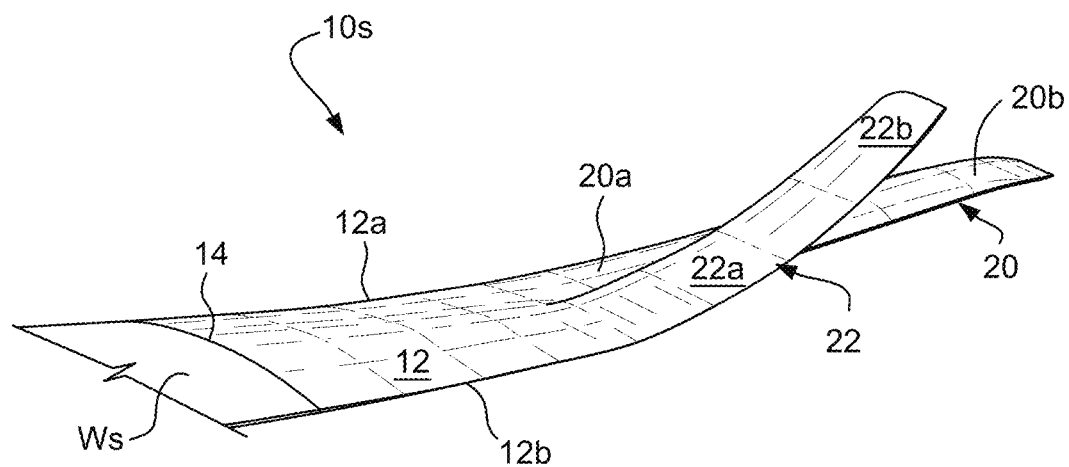
FIG. 2 is a forward looking enlarged perspective view of the starboard winglet depicted in FIG. 1, the port winglet being a mirror image thereof.
Figure 3:
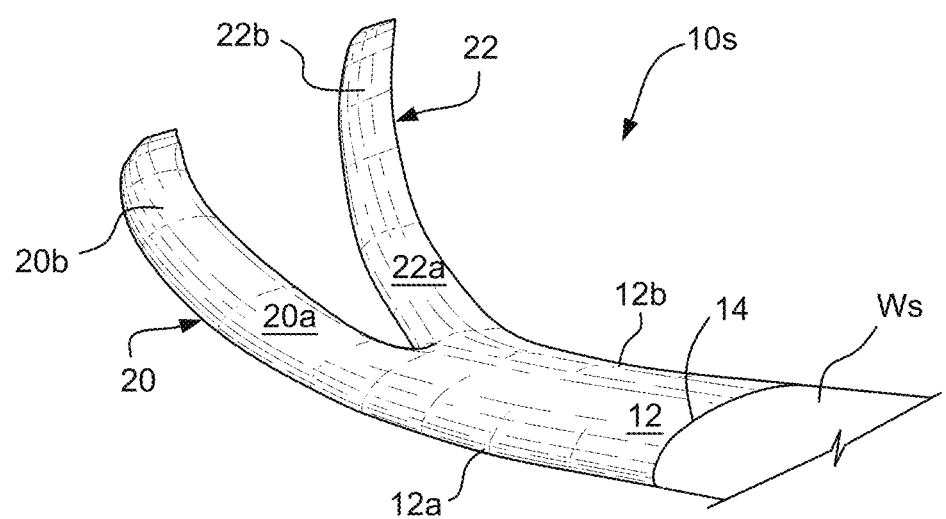
FIG. 3 is an aft looking perspective view of the winglet shown in FIG. 2.
Figure 4:
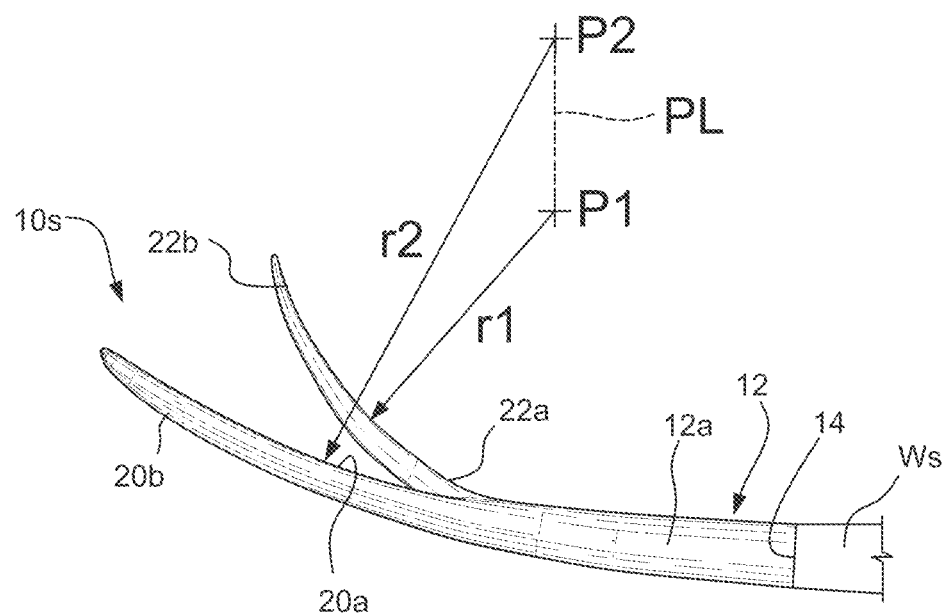
FIGS. 4 and 5 are forward and aft elevational views, respectively, of the winglet shown in FIG. 2.
Figure 5:
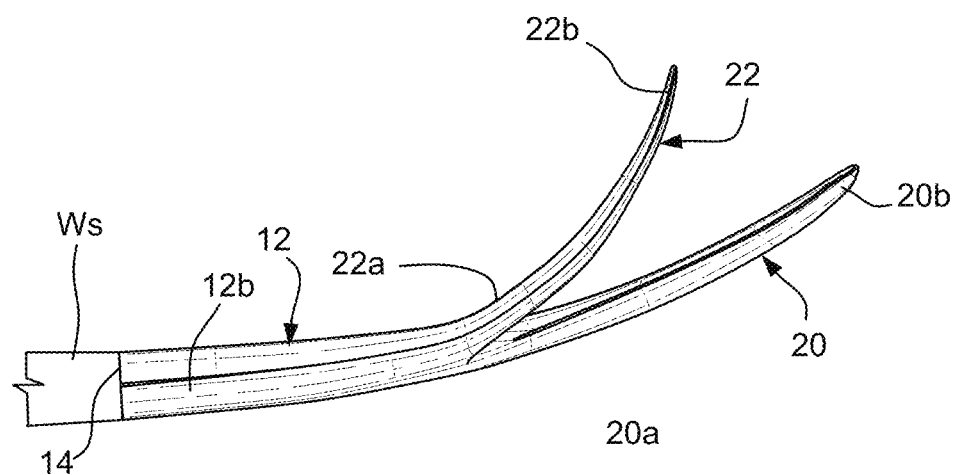

An aircraft AC is depicted in FIG. 1 as conventionally including an aircraft fuselage AF and starboard and port wings Ws and Wp that include starboard and port blended falx winglets 10s, 10p, respectively, in accordance with an embodiment of the present invention. The starboard winglet 10s is shown in greater detail in accompanying FIGS. 2-5. It will be understood in this regard that the port winglet 10p is a mirror image of the starboard winglet 10s and thus the description below with regard to the latter is similarly applicable to the former.

As shown, the winglet 10s includes an initial section 12 having leading and trailing edges 12a, 12b, respectively, attached to the wing tip of the wing Ws at attachment line 14. The initial section 12 of the winglet 10s will therefore have substantially the same chord as the wing chord at the attachment line 14. Forward and aft sub-winglets 20, 22 extend outwardly and upwardly from the initial section such that the forward sub-winglet 20 is positioned adjacent the leading edge 12a of the initial section 12 and the aft sub-winglet 22 is positioned adjacent the trailing edge 12b of the initial section aft of the forward sub-winglet 20. The forward and aft sub-winglets 20, 22 will include respective arcuately curved transition sections 20a, 22a having different radii of concave curvature and outboard terminal end sections 20b, 22b. The outboard terminal end sections 20b, 22b may be curved or substantially planar and/or may be provided with scimitar tips if required for aerodynamic purposes.

In the embodiment depicted in FIGS. 2-5, the forward sub-winglet 20 will have a relatively flatter profile as compared to the aft sub-winglet 22. That is, the transition section 20a of the forward sub-winglet 20 in the embodiment shown will have a greater radius of curvature r1 as compared to the radius of curvature r2 of the transition section 22a of the aft sub-winglet 22 (see FIG. 4). Further, each of the center points P1 and P2 of each of the radii of curvatures r1 and r2, respectively, is located in the same longitudinal plane PL. The radius of curvature r1 will be at least about 1.5 times, or at least about 2 times or even at least about 3 times greater than the radius of curvature r2. This greater/lesser radii of curvatures r1, r2 of the transition sections 20a, 22a of the forward and aft sub-winglets 20, 22, respectively, will therefore result in the terminal end section 22b of the aft sub-winglet 22 being positioned inboard of the terminal end section 20b of the forward sub-winglet 20 (see FIGS. 4 and 5) relative to a vertical plane parallel to the longitudinal axis of the aircraft fuselage AF. It is believed in this regard that the forward sub-winglet 20 will be capable of generating greater lift as compared to the aft sub-winglet 22, but will still result in greater drag reduction as compared to conventional blended wingtip designs.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A blended falx winglet comprising:
an initial winglet section having leading and trailing edges and adapted to being attached to an aircraft wingtip;
a forward sub-winglet positioned adjacent to the leading edge of the initial winglet section, and
an aft sub-winglet positioned adjacent the trailing edge of the initial winglet section aft of the forward sub-winglet, wherein
each of the aft and forward sub-winglets extend outwardly and upwardly from the initial winglet section, and include respective curved transition sections with different radii of curvatures $r1$ and $r2$ having center points $P1$ and $P2$, respectively, and wherein
the radius of curvature $r2$ of the curved transition section of the forward sub-winglet is greater than the radius of curvature $r1$ of the curved transition section of the aft sub-winglet, and wherein
the center points $P1$ and $P2$ of the radii of curvatures $r1$ and $r2$, respectively, are located in the same longitudinal plane.

2. The blended falx winglet according to claim 1, wherein the radius of curvature $r2$ of the curved transition section of the forward sub-winglet is at least about 1.5 times greater than the radius of curvature $r1$ of the curved transition section of the aft sub-winglet.

3. The blended falx winglet according to claim 1, wherein each of the forward and aft sub-winglets includes a terminal end section extending from the curved transition section.

4. The blended falx winglet according to claim 3, wherein the terminal end section is planar or curved.

5. The blended falx winglet according to claim 3, wherein the terminal end section of the aft sub-winglet is positioned inboard relative to the terminal end section of the forward sub-winglet.

6. An aircraft which comprises the blended falx winglet according to claim 5.

7. An aircraft which comprises the blended falx winglet according to claim 1.

8. An aircraft comprising a fuselage and port and starboard wings, wherein each of the port and starboard wings include the blended falx winglet according to claim 1.

* * * * *